Figure 1:
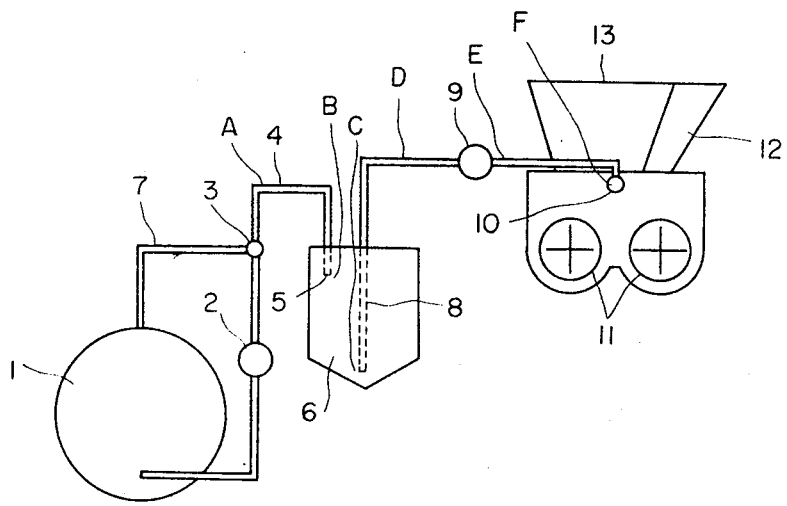

United States Patent
Nomura et al.

[15] 3,666,244
[45] May 30, 1972

[54] PROCESS FOR PRODUCING CUTBACK ASPHALT MIXTURES

[72] Inventors: Shigeho Nomura, Tokyo; Keijiro Murata, Yokohama, both of Japan

[73] Assignee: Sakimura Research Institute Inc., Tokyo, Japan

[22] Filed: Aug. 17, 1970

[21] Appl. No.: 64,367

[30] Foreign Application Priority Data

Aug. 22, 1969 Japan..................................44/65967

[52] U.S. Cl. ..............................259/148, 208/23, 259/159 R
[51] Int. Cl. ..........................................................C10c 3/10
[58] Field of Search.................259/148, 155, 156, 157, 158, 259/159 R, 159 A, 154, 146, 149; 208/23, 39

[56] References Cited

UNITED STATES PATENTS

| | | |
|---|---|---|
| 808,599 | 12/1905 | Crichfield..............................259/154 |
| 2,963,415 | 12/1960 | MacDonald............................208/39 |
| 2,256,281 | 9/1941 | Finley.....................................259/157 |

FOREIGN PATENTS OR APPLICATIONS 282,353  4/1968  Australia...............................259/156

*Primary Examiner*—Walter A. Scheel
*Assistant Examiner*—Philip R. Coe
*Attorney*—Wenderoth, Lind & Ponack

[57] ABSTRACT

A process for producing cutback asphalt mixtures having any desired cutback asphalt mixing ratio by measuring a dope consisting of a petroleum type or coal type solvent alone or said solvent and any additive required for the production of cutback asphalt per one batch and adding the same to one batch of molten asphalt during its flow from a kettle to a mixer in any existing batch type mix plant without previously preparing a cutback asphalt in the kettle and then mixing one batch cutback asphalt thus produced with one batch of a measured aggregate in the mixer.

1 Claims, 4 Drawing Figures

PROCESS FOR PRODUCING CUTBACK ASPHALT MIXTURES

The present invention relates to a process for producing cutback asphalt mixtures. More particularly, the present invention is to provide a novel method for freely producing cutback asphalt mixture of any desired cutback asphalt mixing ratio by measuring a solvent and/or additive required for the production of one batch of cutback asphalt and adding the same to one batch of a measured molten asphalt cement as it flows from a kettle to a mixer in any existing batch type mix plant without previously preparing the cutback asphalt in the kettle as is usually done.

The cutback asphalt so called here is an asphalt cement made by liquefying an ordinary asphalt cement by adding mostly a petroleum type solvent. Generally cutback asphalts are divided into the following three kinds depending on the volatility of the solvent to be added. That is to say, a cutback asphalt diluted with such petroleum type solvent having a high volatility as, for example, a naphtha or gasoline type diluent is classified as a rapid-curing one. A cutback asphalt diluted with such petroleum type solvent having a low volatility as, for example, a heavy oil is classified as a slow-curing one. A cutback asphalt diluted with such solvent having a medium volatility as, for example, kerosene is classified as a medium-curing one. The term cutback asphalt used here means collectively the above described three kinds of cutback asphalts.

As a solvent required to produce a cutback asphalt, it is possible to use not only the above described petroleum type solvent but also a coal type solvent. Further, such petroleum type solvent is used not only alone but also together with an additive for improving the bonding properties of the asphalt cement, which is called hereinafter a stripping preventive and/or any other additives for improving physical and chemical properties of asphalt cement, such as synthetic resin. Therefore, also in the method of the present invention, in blending with asphalt cement there are the following four cases: that is, (1) the case of blending a petroleum type solvent with molten asphalt cement, (2) the case of blending a petroleum type solvent and a stripping preventive with molten asphalt cement, (3) the case of blending a petroleum type solvent and an additive for improving the physical and chemical properties of asphalt cement with molten asphalt and (4) the case of blending a petroleum type solvent, a stripping preventive and an additive for improving physical and chemical properties of asphalt cement with molten asphalt cement. For the sake of the simplification, however, when we use hereinafter the expression of "blending a dope with molten asphalt cement," it is to be understood as comprising all of the above-mentioned four cases. That is, the expression "dope" used hereinafter may be a petroleum type solvent or coal type solvent alone or may be a mixture of said solvent and an additive as a stripping preventive or a mixture of said solvent and an additive for improving physical and chemical properties of asphalt or a mixture of said solvent, a stripping preventive and an additive for improving physical and chemical properties of asphalt.

A mixture made of said cutback asphalt as mixed with such an aggregate as crushed stone, sand and filler is called cutback asphalt mixture. The greatest feature of such cutback asphalt mixture as different from an asphalt mixture usually produced by mixing an ordinary straight asphalt cement with an aggregate is a difference in the paving operation that, if the temperature of the mixture made from an ordinary straight asphalt cement falls to below about 90° C. at the time of paving the same on a road, the mixture cures and loses workability, while the former cutback asphalt mixture retains a sufficient workability even at the atmospheric temperature due to the addition of a solvent and can be stored for a long period of time depending on the mixing ratio of the solvent. From this characteristic viewpoint in the paving operation, in order to definitely contrast the cutback asphalt mixture with the usual asphalt mixture made by using a straight asphalt cement, the former shall be hereinafter characterized by naming the same as "cold-laid asphalt mixture," while the latter as "hot-laid asphalt mixture."

As regards the process for producing the above-mentioned cold-laid asphalt mixture there are two methods practically carried out: that is, a normal temperature mixing system and a hot mixing system. The normal temperature mixing is a method, wherein an aggregate of the atmospheric temperature is literally mixed with a molten asphalt cement, without heating the aggregate to a certain temperature, and the hot mixing system is a method, in which the aggregate is heated to a fixed temperature and then mixed with molten asphalt cement. However, in practice, the normal temperature mixing system is limited only to the case, wherein an aggregate to be used has a very low water content, a water content lower than a specified limit, otherwise its bond with the cutback asphalt cement will be insufficient. Moreover from the viewpoint of the quality of the product the hot mixing system is superior to the normal temperature mixing system, because, when the aggregate is heated to a certain temperature, the bond of the aggregate with the molten asphalt cement is sufficiently increased, partly due to an accelerated molecular activity of a molten asphalt cement caused thereby. Therefore, the hot mixing system is preferable to the normal temperature mixing system.

In the present invention the "cold-laid mixture" in contrast with the hot-laid mixture does not mean a mixture obtained by the normal temperature mixing system but means a normal temperature-laid mixture obtained by the hot mixing system.

However, when heating an aggregate according to the hot mixing system for producing a cold-laid mixture the temperature of heating need not be elevated as in the case of producing a hot-laid mixture, but sufficient to perfectly dry the aggregate. Otherwise, the volatilization of the solvent will be accelerated and part of the required solvent will be lost in vain. Therefore, the upper limit should be kept lower than in the case of producing the hot-laid mixture. Concretely, the temperature of heating the aggregate in the case of producing a cold-laid mixture is preferable to be 100° to 130° C. Therefore, it may be featured as a medium temperature heating in contrast with the high temperature heating in the case of producing the hot-laid mixture. However, it is needless to say that it is possible in some case to elevate the aggregate heating temperature to be above 130° C. according to circumstances.

Heretofore, in the case of producing the above defined cold-laid asphalt mixture by the hot mixing system in any existing plant, it is usual to first produce a liquid cutback asphalt by adding a solvent to a molten asphalt cement in a kettle and then mix a fixed amount thereof with a fixed amount of a separately heated aggregate. Or else, in case a cutback asphalt is already prepared, it is poured into a kettle and is heated to be used.

However, in a practice of producing cold-laid asphalt mixtures by using an existing plant originally designed for producing hot-laid asphalt mixtures, as it is, there have been encountered the following difficulties. That is, when producing cold-laid asphalt mixtures side by side with the conventional production of hot-laid asphalt mixtures on the basis of the same mix plant, it is necessary to separately provide a new kettle designed for the production of cutback asphalt in addition to the existing kettle.

In the case of using the existing kettle as it is without setting a new kettle for economical reasons, the cutback asphalt in the kettle must be swept away before starting the next production of the hot-laid mixture. In such a case, if there is a demand for producing such large amount of cold-laid mixtures as can consume all the amount of the cutback asphalt prepared in the kettle in one operation no great problem will be produced. However, in fact, such case must be said to be very rare. In most cases, in one operation, only a part of all the amount of the cutback asphalt prepared in the kettle is required, and in such case, naturally a large amount of the cutback asphalt must remain in the kettle. When using this residual cutback asphalt next time, there occurs a disadvantage that a part of the volatile composition in the cutback asphalt vanishes, because it must be heated again and, as a result, it is difficult to maintain the expected cutback composition. Further, in sweeping away the residual cutback asphalt remaining in the kettle, there is also a difficulty according to the construction of the bottom part of a kettle, particularly, when the structure is provided, for instance, with a U-formed heating tube in the bottom. In this case, it is difficult to take out the cutback asphalt remaining within the area having the U-formed tube.

Due to the above-mentioned difficulties, it is impossible to adopt the production of cold-laid mixtures so that hot-laid mixtures and cold-laid mixtures may be smoothly alternately produced by using the same mix plant on the base of the conventional production of hot-laid mixtures.

The present invention is to provide an entirely new process for producing cold-laid mixtures to overcome the above described difficulties. That is to say, an object of the present invention is to produce cutback asphalt without preparing the cutback asphalt in advance in a kettle designed to be used for many batches, as is usually done, by measuring a dope required for the production of one batch of cutback asphalt mixture and adding said dope for one batch to one batch of molten asphalt as it flows from the kettle to a mixer in any existing mix plant. Thus, the present invention can be characterized by the expression of "one batch system of producing cutback asphalt mixture," because a dope required for the production of one batch of cutback asphalt mixture is measured per batch and is added to molten asphalt for one batch to produce one batch of cutback asphalt, which is then mixed with one batch of an aggregate in a mixer in any existing batch type mix plant.

Therefore, an object of the present invention is to provide a new operating system, wherein the production of cold-laid mixtures in the same mix plant can be freely adopted on the basis of the conventional production of hot-laid mixtures so that the production of hot-laid mixtures and the production of cold-laid mixtures may be freely alternated.

Another object of the present invention is to provide a technique by which cold-laid mixtures having any desired cutback asphalt mixing ratio can be freely prepared with any existing plant, as it is, without the need of newly providing a plurality of kettles.

A further object of the present invention is to secure a cold-laid mixture of a uniform composition by measuring and adding a dope per batch.

Another object of the present invention is to provide a very economical operating method wherein it is not required to provide additional equipment in any existing plant.

Other objects of the present invention will be clear from the below described explanation and the accompanying drawings.

Now the substance of the present invention shall be explained as follows with reference to the accompanying drawings.

Figure 2:
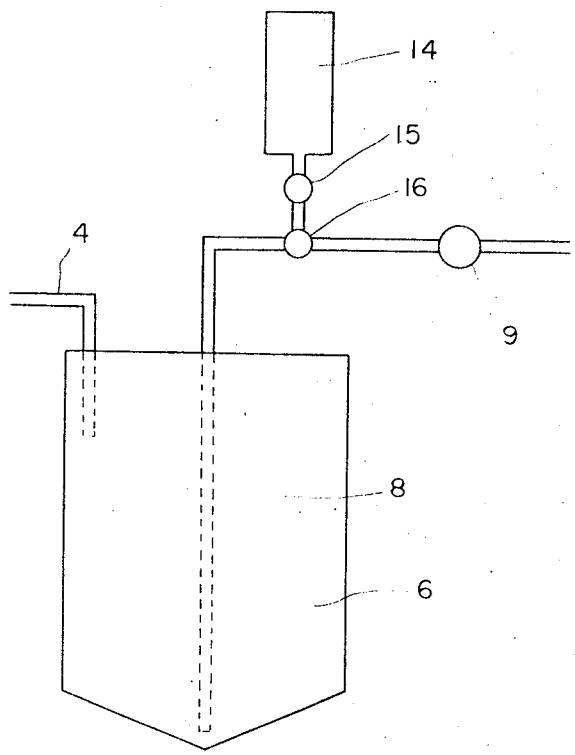
Figure 3:
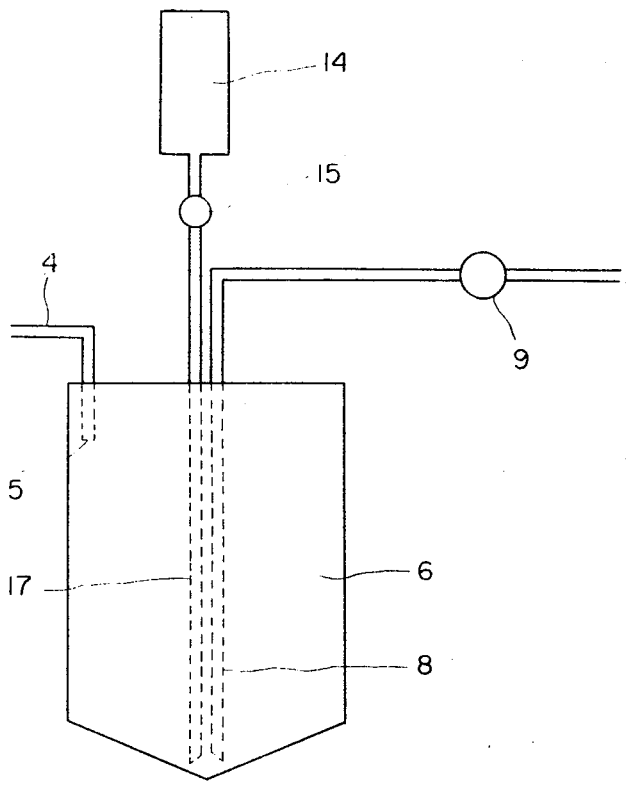
Figure 4:
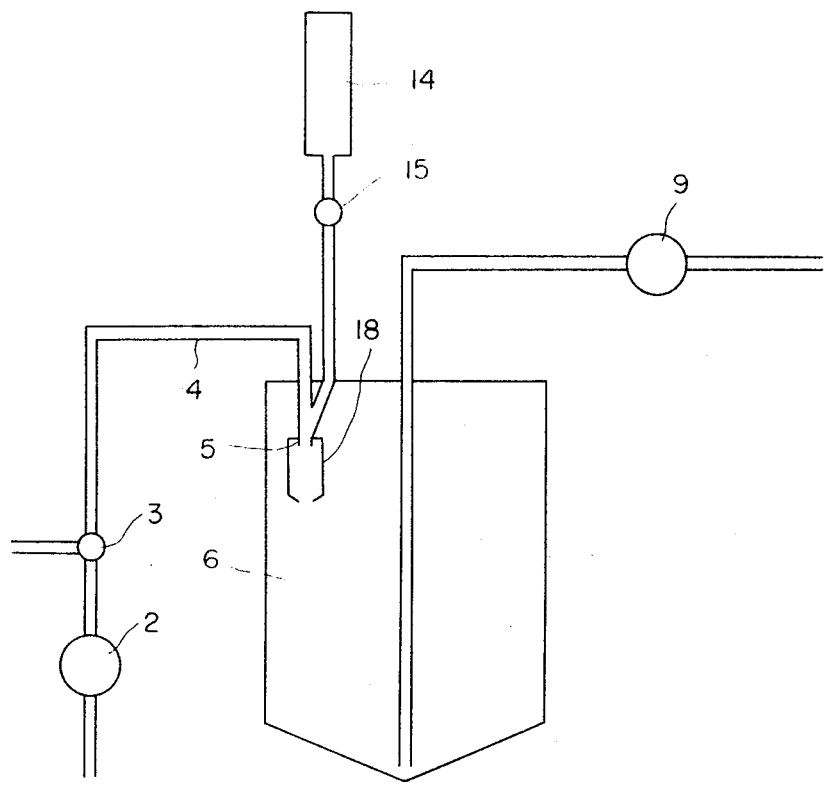

FIG. 1 is a schematic view showing points of adding a dope according to the present invention. FIG. 2 is an explanatory view for the case of adding the dope at the point D in FIG. 1. FIG. 3 is an explanatory view for the case of adding the dope at the point C in FIG. 1. FIG. 4 is an explanatory view for the case of adding the dope at the point B in FIG. 1.

In FIG. 1 which is a schematic view showing points of adding a dope according to the present invention, 1 is a kettle for heating and melting an asphalt cement, 2 is an asphalt feeding pump and 3 is an asphalt feeding two-way switching device which is to feed an asphalt fed from the feeding pump 2 to an asphalt measuring tank 6 through a conduit pipe 4 and its discharging port 5 or is to return it to the kettle 1 through a return conduit pipe 7. The asphalt in the measuring tank 6 is then conveyed into a mixer 11 through an asphalt sucking pipe 8, asphalt pressing feeding pump 9 and discharging nozzle 10. Proper amounts of a filler and aggregate are further put into the mixer 11 through a filler measuring bin 12 and aggregate measuring bin 13 respectively, and are mixed with the above-mentioned asphalt.

The above-mentioned apparatus is to be used to produce ordinary hot-laid asphalt mixtures. The points A, B, C, D, E and F represent respective points of adding the dope to the asphalt according to the present invention. That is to say, as points of adding the solvent, there are concretely the following points in the course of conveying asphalt from the asphalt feeding two-way switching device 3 to the tip of the asphalt discharging nozzle 10:

Point A: This is any point on the asphalt conduit pipe 4 leading from the two-way switching device 3 to the asphalt measuring tank 6.

Point B: This is the position of the discharging port 5 of the asphalt conduit pipe 4 inserted in the asphalt measuring tank 6.

Point C: This is a position near the opening of the asphalt sucking pipe 8 in the asphalt measuring tank 6.

Point D: This is any point on the asphalt conduit pipe leading from the asphalt measuring tank 6 to the asphalt pressing feeding pump 9.

Point E: This is any point on the asphalt conduit pipe leading from the asphalt pressing feeding pump 9 to an asphalt discharging nozzle 10.

Point F: This is the tip of the asphalt discharging nozzle 10.

As regards the points B and C in the asphalt measuring tank it is to note that the dope may be added at any point in the asphalt measuring tank. The points B and C are to be understood as the preferable points.

That is to say, the present invention is characterized by producing a cutback asphalt mixture by measuring an amount of a dope required for the production of one batch of cutback asphalt mixture of a desired cutback asphalt mixing ratio by means of a dope measuring and feeding device (it shall be hereinafter called a doper) provided at any of the above-mentioned six points and adding the measured amount of the dope for one batch to a molten asphalt as it flows from the asphalt feeding two-way switching device to the asphalt discharging device (including the tip of the nozzle) through said doper, thereby to produce a cutback asphalt for one batch, and then mixing the same with a measured aggregate for one batch.

As above described, the process of the present invention includes the addition of a dope to molten asphalt cement at any one of the six points above-mentioned from the asphalt feeding two-way switching device to the asphalt discharging nozzle (including the tip of the nozzle) and the said addition of a dope is limited to the above-mentioned six points, because, if the dope is added before the asphalt feeding two-way switching device, it is likely to circulate back to the kettle together with molten asphalt cement.

In the concrete performance of the process of the present invention the above described adding points have, of course, their own advantages and disadvantages. However, they must be judged from the following two points: (1) that the dope can be added to molten asphalt cement without modifying any existing mix plant as much as possible and (2) that it is possible to uniformly mix the dope with the molten asphalt cement.

The most preferable method as seen from the first viewpoint is a method of adding the dope directly into the asphalt measuring tank, that is, at the point B or C, because, at each of such other points A, D and E a dope pouring port must be provided by perforating the asphalt conduit pipe, and further in the case of adding the dope at the point F, that is, at the tip of the asphalt discharging nozzle, as there are a plurality of nozzles, the nozzles must be provided with respective dopers. But, in the case of the points B or C the dope can be added by merely inserting a pipe connecting the doper with the asphalt measuring tank into the latter.

From the second viewpoint of uniformly mixing the dope with the molten asphalt, the addition before the asphalt pressing feeding pump 9 is better than the addition thereafter, because the asphalt pressing feeding pump 9 acts as an agitator.

In addition to the above two conditions a further condition must be also taken into consideration, that the system of feeding the doper is somewhat different depending upon the adding point of the dope. Now, this viewpoint shall be explained with reference to FIGS. 2, 3 and 4.

In FIG. 2 which is an explanatory view for the case of adding the dope at the point D on the conduit pipe leading from the asphalt measuring tank to the asphalt pressing feeding pump, 6 is an asphalt measuring tank, 8 is an asphalt sucking pipe, 9 is an asphalt pressing feeding pump, 14 is a doper, 15 is a dope flow regulating valve and 16 is a check valve. In such case, the dope is added from the doper so that the dope measured for one batch may be uniformly mixed into the molten asphalt through the dope flow regulating valve 15 and both are agitated and mixed together by the asphalt pressing feeding pump 9. By the way, in this case, as the dope is added to the molten asphalt by utilizing the head, it is not necessary to separately provide a pump for feeding the dope. On the contrary, in the case of adding the dope at the point E after the pressing feeding pump 9, as the dope must be added to the already compressed asphalt, it is necessary to separately provide a dope pressing pump. In this sense, the addition at the point D is more advantageous than the addition at the point E. By the way, the addition at the point A is the same in principle as the addition at the point D.

In FIG. 3 which is an explanatory view for the case of adding the dope at the point C, that is, directly into the asphalt measuring tank or more particularly the case that a dope feeding pipe extending from the doper is provided adjacent to the asphalt sucking pipe within the asphalt measuring tank and the dope is added through the opening of the dope feeding pipe, 6 is an asphalt measuring tank, 8 is an asphalt sucking pipe, 14 is a doper, 17 is a dope feeding pipe extending from the doper 14 and 15 is a dope flow regulating valve. In such case, as the opening of the asphalt sucking pipe and the opening of the dope feeding pipe are provided adjacent to each other, the added dope is sucked into the molten asphalt at a uniform rate, synchronized with the function of the asphalt pressing feeding pump.

Further, in this case, it is not necessary to provide a valve for checking the reverse flow of the molten asphalt as is shown in FIG. 2.

In FIG. 4 which is an explanatory view for the case of adding the dope at the point B, that is, directly into the asphalt measuring tank or more particularly the case that the dope is added to the opening of the asphalt conduit pipe within the asphalt measuring tank, 4 is an asphalt conduit pipe, 5 is a conduit pipe opening, 6 is an asphalt measuring tank, 14 is a doper, 15 is a dope flow regulating valve and 18 is an agitating device. In this case, too, the same as in the case of FIG. 3, it is not necessary to provide a check valve. But, as different from the case of FIG. 3, it is preferable to provide the opening of the asphalt conduit pipe with an agitating device to secure a more perfect mixing of the dope with the molten asphalt.

Also, in the case of adding the dope at the point F, that is, at the tip of the nozzle discharging the asphalt into the mixer, as in FIG. 4, it is also necessary to provide each nozzle with an agitating device. In this respect, the addition at the point B is more advantageous than the addition at the point F.

As in the above, it is possible to add the dope at any of the above-mentioned points by the provision of a proper device. However, generally speaking, it is preferable to add the dope at a point before the asphalt pressing feeding pump 9 from the viewpoints of the economy of the equipment and the efficiency in securing the uniform mixing of the dope and molten asphalt, as evident from the above description. Further, what point among the points A to D before the asphalt pressing feeding point is to be selected may be freely determined according to circumstances.

The doper, a dope measuring and feeding device, used in the process of the present invention is preferably an automatic control system, mainly composed of a control circuit and a feeding system and operating synchronized with the measuring of molten asphalt cement for one batch.

Further, in the present invention, for the asphalt measuring tank there may be used a tank of the volume measuring type as well as one of the weight measuring type.

In order to more concretely explain the present invention, examples shall be given in the following.

EXAMPLE 1:

In a mix plant of an asphalt mixture producing capacity of 1 ton per batch, an asphalt cement of a penetration of 80 was heated and melted at 150° C. in a kettle. On the other hand, an aggregate having the below mentioned aggregate granularity composition, that is, of a dense granularity was heated to 120° C.

Aggregate composition
(Sieve passing weight in %)

| Meshes of the sieve in mm. | Passing amount in % |
| --- | --- |
| 19.1 | — |
| 12.7 | 100 |
| 4.76 | 70 |
| 2.38 | 48 |
| 0.59 | 25 |
| 0.297 | 13 |
| 0.149 | 10 |
| 0.074 | 4 |

Then, a dope composed of a petroleum type fractionated oil of a boiling point of from 170° to 300° C., that is, kerosene, as a solvent and a stripping preventive together with an additive for improving qualities of the asphalt added to the solvent in an amount totalling about 2 percent of the solvent was put in the doper and was measured therein so that the cutback asphalt mixing ratio might be 6 percent by weight on the asphalt mixture and the ratio of the asphalt cement to the dope might be 4.9 to 1 and was added in an amount required per one batch to the molten asphalt at the point C, that is, through the opening of the dope feeding pipe inserted into the asphalt measuring tank directly from the doper, synchronized with the measuring of the molten asphalt. The dope was used at the normal temperature.

As a result, there was obtained a cutback asphalt mixture having a mixing ratio of

| | |
| --- | --- |
| Asphalt | 49 kg.(4.9%) |
| Dope | 11 kg.(1.1%) |
| Aggregate | 940 kg.(94.0%) | in a 1 ton batch. This mixture showed an excellent character in respect that it was a uniform mixture of dope and asphalt cement. When the mixture stored as covered with a sheet for one week after it was produced and was then laid, a favorable workability was retained.

EXAMPLE 2:

The dope was added any point in the asphalt measuring tank including the point B under the same conditions as in Example 1. At first the dope was added in the opening port of the asphalt discharging pipe inserted in the asphalt measuring tank and in subsequent trials the dope was added at points in the asphalt measuring tank. In both cases the dope was added synchronized with the plant cycle. As a result there was obtained substantially the same mixture as was obtained in Example 1.

EXAMPLE 3:

In a mix plant of an asphalt mixture producing capacity of 600 kg. per batch, an asphalt of a penetration of 80 was heated and melted at 150° C. in the kettle. On the other hand, an aggregate having the same aggregate composition as in the case of Example 1 was heated to 100° C.

Then, a dope of the same composition as in Example 1 was inserted into the doper, was measured so that the mixing ratio of the cutback asphalt might be 7.5 percent by weight on the mixture and the ratio of the asphalt to the dope might be 5.85 : 1.65 and was added in an amount of the dope required per batch at the point D, that is, through a small hole made at a point on the conduit pipe between the asphalt measuring tank and asphalt pressing feeding pump through the dope regulating valve so as to be uniformly mixed into the asphalt in the amount required per batch. The dope was used at the normal temperature.

As a result, there was obtained a cutback asphalt mixture having mixing ratio of

| Asphalt | 35.1 kg.(5.85%) |
| Dope | 9.9 kg.(1.65%) |
| Aggregate | 555.0 kg.(92.5%) | in a 600 kg. batch. When this mixture was stored for 10 days and was then laid, the same favorable workability as in the case of Example 1 was retained.

EXAMPLE 4:

Under the same conditions as in Example 3, a dope was added at the point A, that is, through a small hole made at a point on the conduit pipe between the asphalt feeding two-way switching device and the asphalt measuring tank. In this case, too, the same mixture as in Example 3 was obtained.

EXAMPLE 5:

In a mix plant having an asphalt mixture producing capacity of 500 kg. per batch, an asphalt was heated and melted to 150° C. On the other hand, an aggregate of a dense granularity was heated to 120° C. Further, the adding ratio of a cutback asphalt was made 6 percent. A dope in such amount that the mixing ratio of the asphalt to the dope might be 78 : 22 was measured per batch and was added at the point E, that is, through a small hole made at a point on the conduit pipe between the asphalt pressing feeding pump and asphalt discharging nozzle. In this case, a dope pressing feeding pump of a capacity of 380 liters/min. was used.

As a result, there was obtained a mixture having a composition of

| Asphalt | 23.4 kg.(4.68%) |
| Dope | 6.6 kg.(1.32%) |
| Aggregate | 420.0 kg.(94%) |

When this mixture was stored for 2 weeks after it was produced and was then laid, the same favorable workability was retained.

EXAMPLE 6:

Under the same conditions as in Example 5, a dope was added at the point F, that is, at the tip of each asphalt discharging nozzle. In this case, as there were 6 nozzles, an agitating device was provided at the tip of each nozzle so that the asphalt discharged out of the nozzle and the dope might be well uniformly mixed together.

However, the mixture obtained by adding the dope at the tip of nozzle was nevertheless still not as favorable as those obtained at any of the previous points. This is thought to be attributable to the facts that the penetration of the dope into the asphalt cement was somewhat insufficient and there was still an unevenness in the mixing of both.

The industrial value obtained by the process of the present invention is high. The fact that, in the same existing mix plant for producing hot-laid asphalt mixtures, hot-laid mixtures and cold-laid mixtures can be freely alternately produced without the need of providing a new kettle separately or making a great modification in the structure of the existing plant is a new technique to be easily adopted and welcomed in the existing plant, since the rate of utilization of the plant can be elevated when the operation degree of such plant is generally so low today that it is difficult for the management of most plants to maintain their economical independency.

What is more important is the following advantage of the present invention. In general, a cold-laid mixture must vary its mixing ratio of cutback asphalt depending upon differences in the purpose or manner of using the same, that is, whether it is to be used for a pavement of a large scale, overlaying, repair or patching, or when it is to be used, or how long it is to be stored, or whether it is used in summer or winter or in what region it is to be used. The possibility of freely making desired cutback asphalt mixture by varying the mixing ratio and kind of solvent to be added according to the above-mentioned conditions should be said to be an advantageous feature of cutback asphalt mixture in general, which is, however, practically impossible to realize according to the conventional system, because so many kettles must be prepared therefor. On the contrary, according to the one-batch system of the present invention a cutback asphalt mixture having a desired mixing ratio and kind of solvent can be freely produced in any desired amount.

In connection with the above-mentioned it is to be noted that according to the method of the present invention even a quick-curing cutback asphalt, which is not easy or sometimes even dangerous to produce in a kettle according to the conventional system, because of a high volatile solvent such as naphtha or gasoline being used as a solvent, can be safely produced according to the method of the present invention.

Moreover, in the case of making hundreds of batches of a cutback asphalt in a kettle, as is usually done in the conventional system, the uniform mixing of a solvent and molten asphalt cement is not easily attainable, because it is difficult to thoroughly agitate them due to the large quantities involved and in addition thereto sometimes due to the shape and construction of the kettle, particularly, when it is square-shaped or it has a heating U-type tube in the bottom thereof.

On the contrary, it is easily understandable from the foregoing explanation that by the mixing method of the present invention a perfectly uniform mixing of the dope and molten asphalt can be easily performed and secured.

The object of the present invention relates to the production of cutback asphalt mixtures to be cold-laid. However, in view of the inventive spirit of the present invention it is indifferent for the present invention, what kind of contents the dope to be added to a molten asphalt cement may have. As already mentioned, it may be a petroleum or coal type solvent alone or a mixture of a solvent and a stripping preventive or a mixture consisting of a solvent, a stripping preventive and an additive for improving physical and chemical properties of asphalt in any percentage of each component respectively. Besides those above-mentioned it may be a stripping preventive alone to be added to a molten asphalt without the addition of a solvent or also an additive for improving physical and chemical properties of asphalt alone without the addition of a solvent. The addition of any of the additive in the above-mentioned concept falls within the scope of the present invention.

What is claimed is:

1. A process for manufacturing a cutback asphalt mixture having any desired cutback asphalt mixing ratio in an existing batch type mix plant, comprising heating and melting an asphalt cement in an existing kettle installed in said mix plant according to a known manner; causing said melted asphalt cement to flow to an asphalt measuring tank; measuring a dope to be added to said molten asphalt to produce a cutback asphalt in an amount required for the production of one batch of cutback asphalt of any desired dope-mixing ratio in a dope measuring tank; feeding said measured dope to said molten asphalt in said asphalt measuring tank in synchronization with the feeding of said molten asphalt from said kettle to a mixer; and mixing one batch of the thus produced cutback asphalt with one batch of a measured aggregate in said mixer.

* * * * *